US010005959B2

(12) United States Patent
Han et al.

(10) Patent No.: US 10,005,959 B2
(45) Date of Patent: Jun. 26, 2018

(54) LIQUID CRYSTAL COMPOSITION HAVING NEGATIVE DIELECTRIC ANISOTROPY AND DISPLAY DEVICE THEREOF

(71) Applicant: JIANGSU HECHENG DISPLAY TECHNOLOGY CO., LTD., Jiangsu (CN)

(72) Inventors: Wenming Han, Jiangsu (CN); Haibin Xu, Jiangsu (CN); Wenyang Ma, Jiangsu (CN)

(73) Assignee: JIANGSU HECHENG DISPLAY TECHNOLOGY CO., LTD., Jiangsu (CN)

( * ) Notice: Subject to any disclaimer, the term of this patent is extended or adjusted under 35 U.S.C. 154(b) by 0 days. days.

(21) Appl. No.: 15/329,250

(22) PCT Filed: Aug. 12, 2015

(86) PCT No.: PCT/CN2015/086702
§ 371 (c)(1),
(2) Date: Jan. 26, 2017

(87) PCT Pub. No.: WO2016/029797
PCT Pub. Date: Mar. 3, 2016

(65) Prior Publication Data
US 2017/0210987 A1    Jul. 27, 2017

(30) Foreign Application Priority Data
Sep. 2, 2014   (CN) .......................... 2014 1 0444668

(51) Int. Cl.
*G02F 1/1333* (2006.01)
*C09K 19/30* (2006.01)
(Continued)

(52) U.S. Cl.
CPC ........ *C09K 19/3066* (2013.01); *C09K 19/542* (2013.01); *G02F 1/133365* (2013.01);
(Continued)

(58) Field of Classification Search
CPC .............. C09K 19/3066; C09K 19/542; C09K 2019/3069; C09K 2019/548;
(Continued)

(56) References Cited

U.S. PATENT DOCUMENTS 8,535,768 B2 *   9/2013   Saito ...................... C09K 19/12
                                                        252/299.01

FOREIGN PATENT DOCUMENTS

CN   102292412   12/2011
CN   102433130   5/2012
(Continued)

OTHER PUBLICATIONS

"International Search Report (Form PCT/ISA/210)", dated Nov. 5, 2015, with English translation thereof, pp. 1-4.

*Primary Examiner* — Geraldina Visconti
(74) *Attorney, Agent, or Firm* — JCIPRNET

(57) ABSTRACT

The present invention discloses a liquid crystal composition comprising: 15-35% by weight of a compound of general formula I; 3-20% by weight of a compound of general formula II; 5-30% by weight of a compound of general formula III; 1-20% by weight of a compound of general formula IV; 10-35% by weight of a compound of general formula V-1 and/or a compound of general formula V-2; and 1-25% by weight of a compound of general formula VI. The liquid crystal composition provided by the present invention has the characteristics of an appropriate optical anisotropy, an appropriate dielectric anisotropy, a higher clearing point, a better voltage holding ratio, and a good UV-resistant stability, etc., and can be applied to a liquid crystal display.

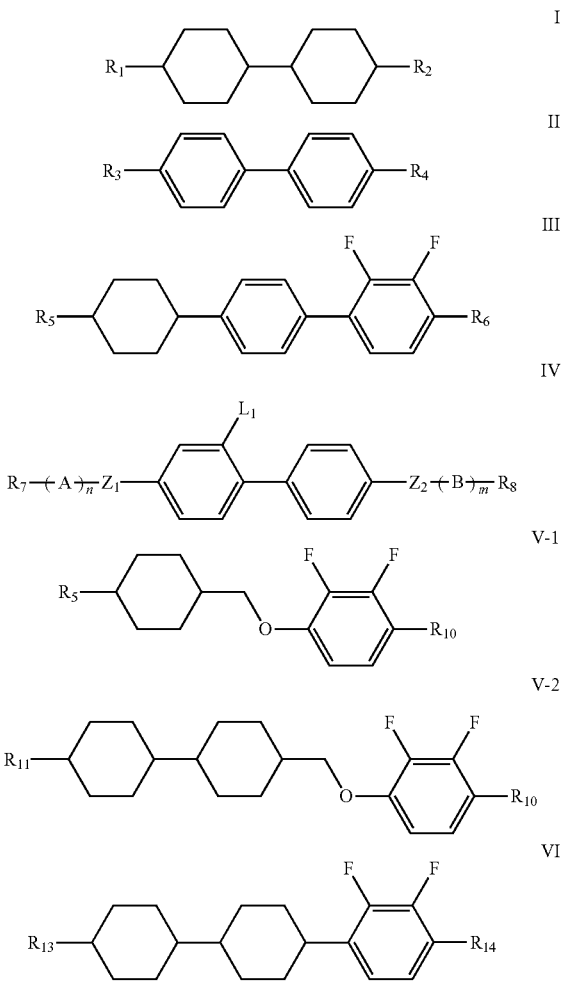

13 Claims, No Drawings

(51) Int. Cl.
  *C09K 19/54* (2006.01)
  *G02F 1/1337* (2006.01)
(52) U.S. Cl.
  CPC ............... *C09K 2019/3096* (2013.01); *C09K 2019/548* (2013.01); *G02F 1/133711* (2013.01); *G02F 2001/133742* (2013.01); *G02F 2202/022* (2013.01)
(58) Field of Classification Search
  CPC ............ G02F 1/1333; G02F 1/133365; G02F 1/133711; G02F 2202/022
  USPC ........................................ 252/299.6; 428/1.1
  See application file for complete search history.

(56) References Cited

FOREIGN PATENT DOCUMENTS

| | | |
|---|---|---|
| CN | 102517038 | 6/2012 |
| CN | 103038313 | 4/2013 |

\* cited by examiner

LIQUID CRYSTAL COMPOSITION HAVING NEGATIVE DIELECTRIC ANISOTROPY AND DISPLAY DEVICE THEREOF

CROSS-REFERENCE TO RELATED APPLICATION

This application is a 371 application of an International PCT application serial no. PCT/CN2015/086702, filed on Aug. 12, 2015, which claims the priority benefits of China Application No. 201410426055.9, filed on Aug. 26, 2014. The entirety of each of the above-mentioned patent applications is hereby incorporated by reference herein and made a part of this specification.

TECHNICAL FIELD

The present invention relates to a liquid crystal composition, in particularly to a liquid crystal composition having an appropriate optical anisotropy, an appropriate dielectric anisotropy, a higher clearing point and a good UV-resistant stability, and a liquid crystal display device comprising the liquid crystal composition.

BACKGROUND ART

Liquid crystal is mainly used as a dielectric medium in liquid crystal display elements, because the optical properties of such materials can be affected by an applied voltage. Liquid crystal display elements are divided, according to operation modes, into phase change (PC), twisted nematic mode (TN), super twisted nematic mode (STN), electrically controlled birefringence (ECB), optically compensated bend (OCB), lateral electric field switching, vertical alignment (VA), polymer stabilized alignment (PSA) modes, etc.

Liquid crystal display elements used at present are mainly those liquid crystal display elements of TN type. However, they have a defect of a strong contrast and viewing angle dependence. In addition, so-called VA type liquid crystal display elements are known to have a broader viewing angle. A liquid crystal cell of a VA type liquid crystal display element contains a liquid crystal medium layer between two transparent electrodes, wherein the liquid crystal medium generally has a negative dielectric anisotropy value. Under a condition of power outage, molecules of the liquid crystal layer are aligned perpendicularly to electrode surfaces (homeotropically) or has an inclined homeotropic alignment. When a voltage is applied to the electrodes, realignment of the liquid crystal molecules parallel to the electrode surfaces occurs.

In addition, it is known that OCB type liquid crystal display elements are based on a birefringent effect and have a liquid crystal layer having a so-called "curved" alignment and a generally positive dielectric anisotropy. When a voltage is applied, realignment of liquid crystal molecules parallel to the electrode surfaces occurs. In addition, OCB type liquid crystal display elements generally comprise one or more birefringent optical retardation films to prevent a curved cell from an unexpected optical transparency under a dark condition. OCB type liquid crystal display elements, compared with TN type liquid crystal display elements, have a broader viewing angle and a shorter response time.

With regard to a PSA type liquid crystal display element, under a condition of disposing a polymerizable liquid crystal composition formed from a liquid crystal composition and a polymerizable compound between substrates, a voltage is applied between substrates as appropriate to make liquid crystal molecules aligned, and with ultraviolet irradiation under the aligned state, etc., the polymeric compound is polymerized so that the alignment state of the liquid crystal is memorized as a cured substance. At present, the PSA principle is being used in various traditional liquid crystal display elements. Therefore, for example, PSA-VA, PSA-OCB, PS-IPS/FFS- and PS-TN-display elements are known.

However, not all combinations composed of a liquid crystal composition and a polymerizable compound are suitable for PSA display elements. This is because, for example, an inclination or sufficient inclination cannot be obtained by adjustment, or because, for example, so-called "voltage holding ratio (VHR)" is insufficient in TFT display applications. Moreover, it has been found that when used in PSA display elements, there are still some defects for known liquid crystal compositions and polymeric compounds in the prior art. Therefore, not every known polymerizable compound soluble in liquid crystal composition is suitable for PSA display elements. The selected combination of a liquid crystal composition and a polymeric compound should have the best possible electrical properties, and especially, should have a VHR as high as possible. In a PSA display element, a high VHR after irradiation with a UV light is particularly necessary.

As a subject of such a liquid crystal display element, there are reliability problems such as "burned-in" produced when the same displaying continues for a long time and producibility problems caused in the manufacture process. The reliability problems are not caused by a single factor but by several complex factors, particularly caused by an inclination change of liquid crystal molecules (change in a pretilt angle).

An object of the present invention is to provide new materials suitable for a PSA type liquid crystal display element, particularly a combination of a liquid crystal composition and a polymerizable compound, which are suitable for solving the above-mentioned problems, and can overcome the above-mentioned defects when used in a PSA type liquid crystal display element. The combination of a liquid crystal composition and the polymerizable compound provided by the present invention has a larger operating temperature range, and further has an appropriate dielectric anisotropy, an appropriate optical anisotropy and a high VHR value after exposed to UV. When the combination comprising the liquid crystal composition and the polymerizable compound of the present invention is used, as compared to the prior art, it has the characteristics of a good UV resistant performance and being capable of producing a pretilt angle more quickly.

SUMMARY OF THE INVENTION

The technical problem to be solved by the present invention is to provide a liquid crystal composition, i.e. a liquid crystal composition having an appropriate optical anisotropy, an appropriate dielectric anisotropy, a higher clearing point, a good UV-resistant stability and a strong pretilt angle forming ability. Said liquid crystal composition can be applied to a liquid crystal display, such that the liquid crystal display has the characteristics of a high reliability, being capable of normal operation after UV illumination, etc. The liquid crystal composition provided by the present invention has a better pretilt angle forming ability, enabling a polymer-stabilized vertical alignment display element to have a better optical effect, the liquid crystal composition of the present invention has a better VHR value after UV illumination, and the liquid crystal display device using the liquid crystal composition of the present invention has a better stability.

The technical solution adopted by the present invention is:

a liquid crystal composition having a negative dielectric anisotropy, comprising:

15-35% by weight of a compound of general formula I,

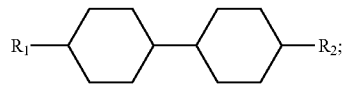

3-20% by weight of a compound of general formula II,

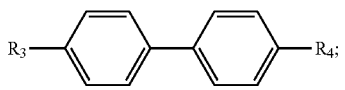

5-30% by weight of a compound of general formula III,

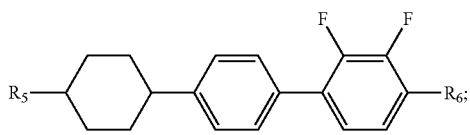

1-20% by weight of a compound of general formula IV,

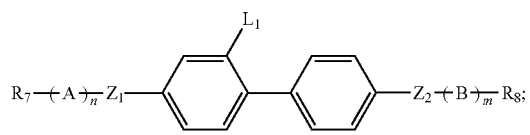

10-35% by weight of a compound of general formula V-1 and/or a compound of general formula V-2,

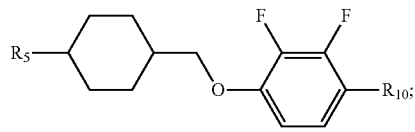

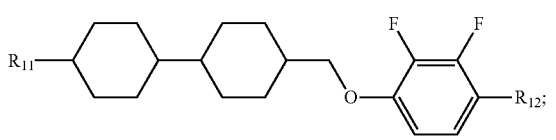

and 1-25% by weight of a compound of general formula VI,

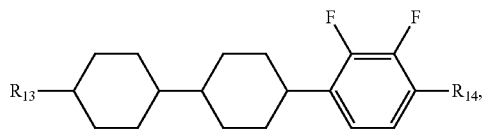

wherein $R_1$, $R_2$, $R_3$, $R_4$, $R_5$, $R_9$, $R_{11}$ and $R_{13}$ are the same or different and each independently represents an alkyl group having a carbon atom number of 1 to 5;

$R_6$, $R_{10}$, $R_{12}$ and $R_{14}$ are the same or different, and each independently represents an alkyl group having a carbon atom number of 1 to 5 or an alkoxy group having a carbon atom number of 1 to 5;

$R_7$ and $R_8$ are the same or different, and each independently represents H or an alkyl group having a carbon atom number of 1 to 10, wherein one or more non-adjacent $CH_2$ groups may be replaced by —O—, —CO—, —COO—, —OCO—O— or —OCO—, the oxygen atoms are not directly connected, and one or more H atoms can be replaced by fluorine;

$L_1$ represents H or F;

$Z_1$ and $Z_2$ are the same or different, and each independently represents —$CH_2O$—, —$OCH_2$—, —O—, —$CH_2CH_2$— or a single bond, and at least one of $Z_1$ and $Z_2$ is —$CH_2O$—, —$OCH_2$— or —O—;

A and B are the same or different, and each independently represents 1,4-cyclohexylene or 1,3-cyclopentylene, wherein one or more non-adjacent $CH_2$ groups may be replaced by —O—; and m and n are the same or different, and each independently represents 0, 1 or 2, with $n+m \leq 2$.

The compound of general formula I is preferably one or more compounds selected from the group consisting of the following compounds:

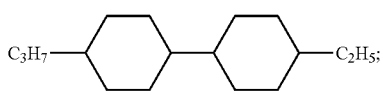

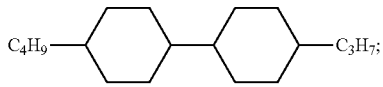

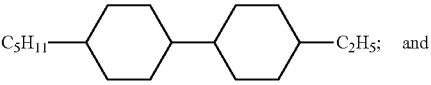 and

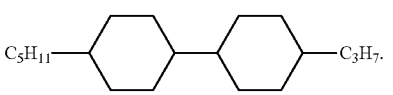

The compound of general formula II is preferably one or more compounds selected from the group consisting of the following compounds:

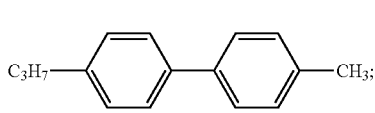

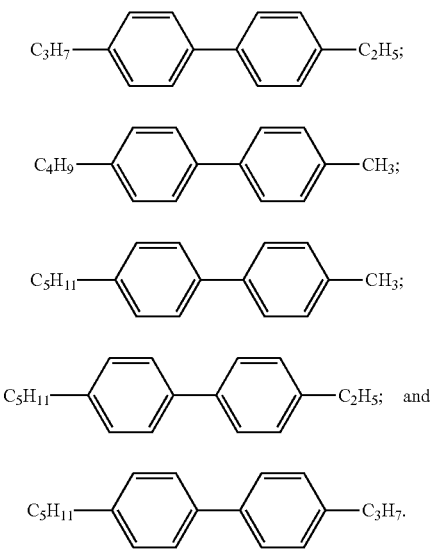

II-2
II-3
II-4
II-5
II-6

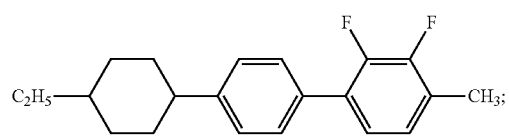
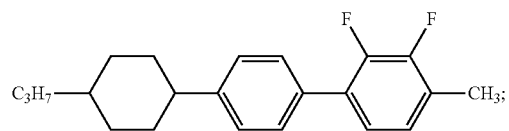
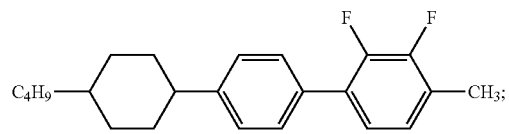
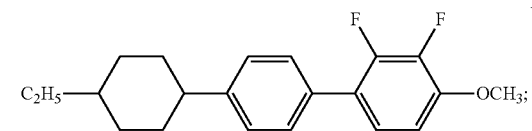
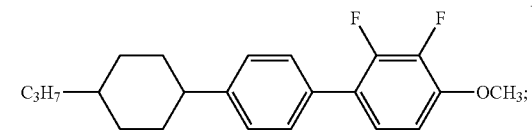

The compound of general formula III is preferably one or more compounds selected from the group consisting of the following compounds:

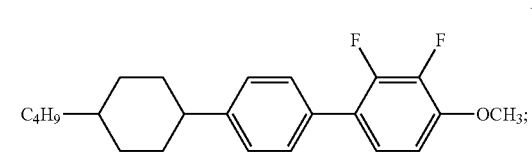

III-1
III-2
III-3
III-4
III-5
III-6

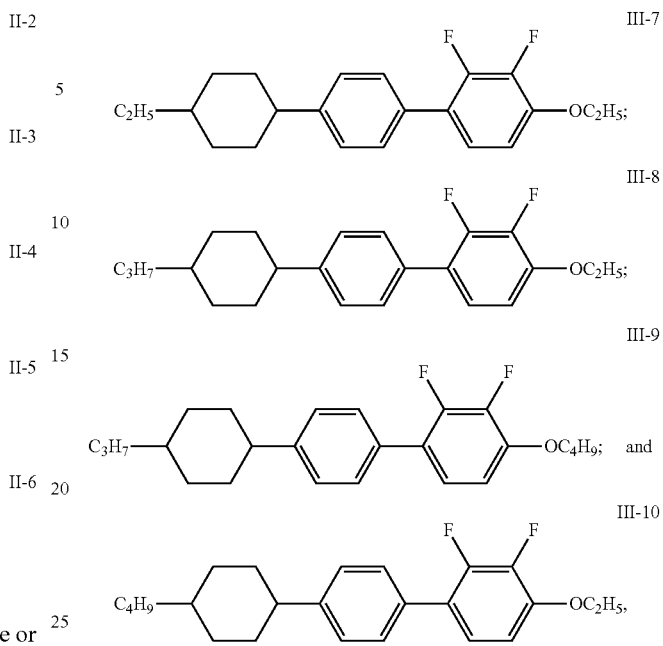

III-7
III-8
III-9
III-10

The compound of general formula III is preferably a compound of III-4, III-5, III-7, III-8 or III-9, particularly preferably a compound of III-7, III-8 or III-9.

The compound of general formula IV is preferably one or more compounds selected from the group consisting of the following compounds:

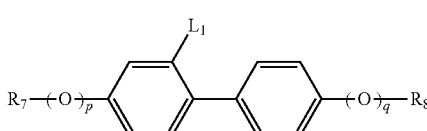
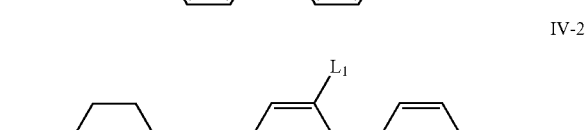
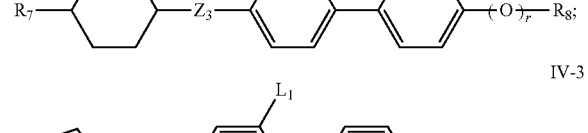
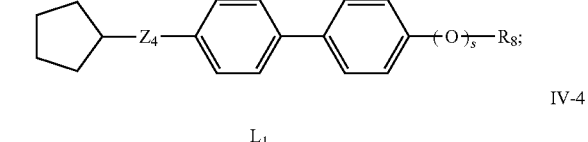
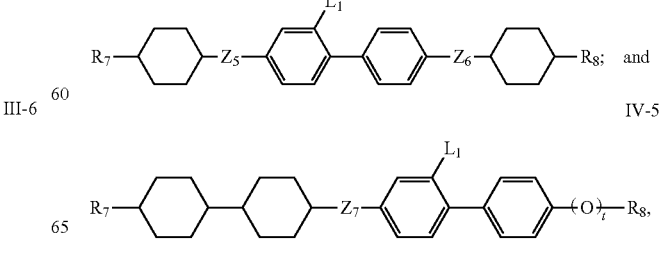

IV-1
IV-2
IV-3
IV-4
IV-5 wherein

R₇ and R₈ are the same or different, and each independently represents an alkyl group having a carbon atom number of 1 to 10, wherein one or more H atoms can be replaced by fluorine;

L₁ represents H or F;

Z₃, Z₄, Z₅, Z₆ and Z₇ are the same or different, and each independently represents —CH₂O—, —OCH₂—, —O—, —CH₂CH₂— or a single bond;

p, q, r, s and t are the same or different, and each independently represents 0 or 1, with p+q≥1.

The compound of general formula IV-1 is particularly preferably one or more compounds selected from the group consisting of the following compounds:

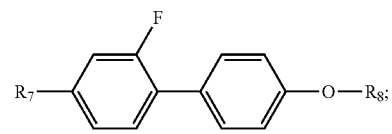
IV-1a

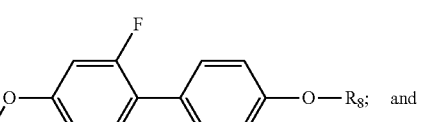
IV-1-b

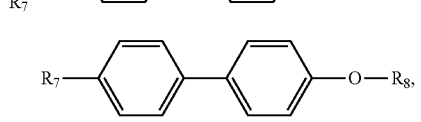
IV-1-c wherein

R₇ and R₈ are the same or different, and each independently represents an alkyl group having a carbon atom number of 1 to 5, especially preferably a compound of general formula IV-1-c.

The compound of general formula IV-2 is particularly preferably one or more compounds selected from the group consisting of the following compounds:

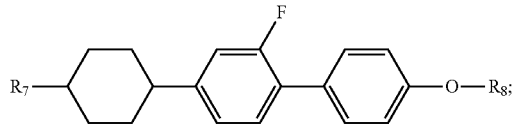
IV-2-a

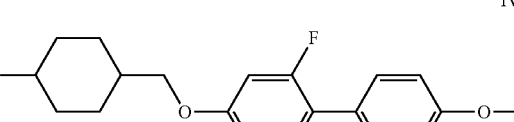
IV-2-b

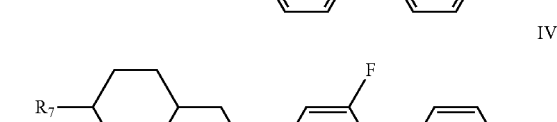
IV-2-c

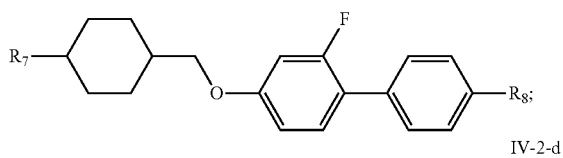
IV-2-d

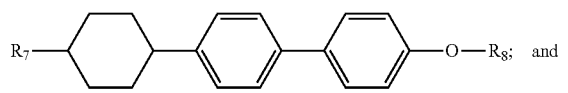
and

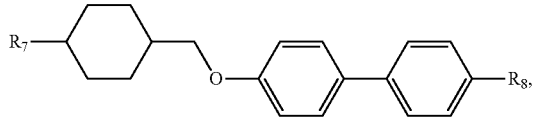
IV-2-e wherein

R₇ and R₈ are the same or different, and each independently represents an alkyl group having a carbon atom number of 1 to 5, especially preferably a compound of general formula IV-2-d and a compound of general formula IV-2-c.

The compound of general formula IV-3 is particularly preferably one or more compounds selected from the group consisting of the following compounds:

IV-3-a

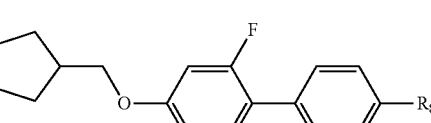
IV-3-b

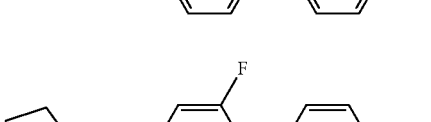
IV-3-c

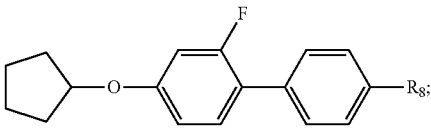
IV-3-d

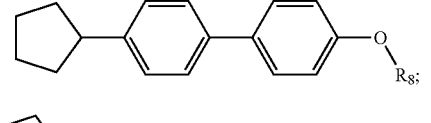
IV-3-e

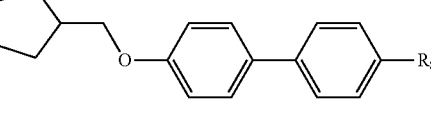
IV-3-f

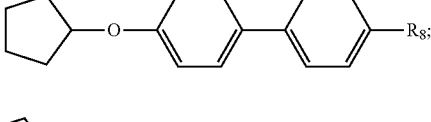
IV-3-g and

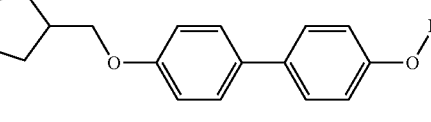
IV-3-h wherein

R₈ independently represents an alkyl group having a carbon atom number of 1 to 5, especially preferably a compound of general formula IV-3-d.

The compound of general formula IV-4 is particularly preferably one or more compounds selected from the group consisting of the following compounds:

IV-4-a
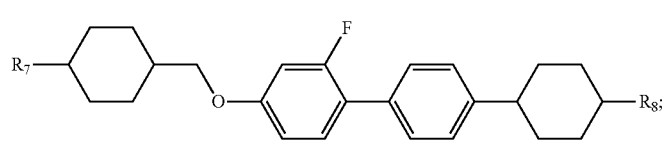

IV-4-b
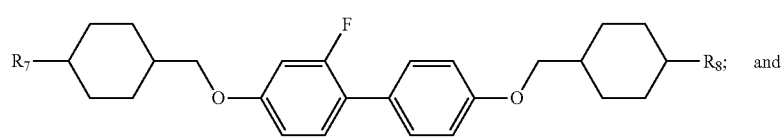
and

IV-4-c
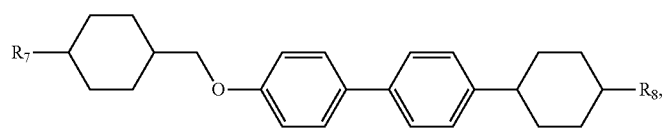

wherein $R_7$ and $R_8$ are the same or different, and each independently represents an alkyl group having a carbon atom number of 1 to 5.

The compound of general formula IV-5 is particularly preferably one or more compounds selected from the group consisting of the following compounds:

IV-5-a
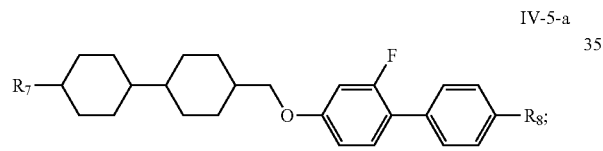

IV-5-b
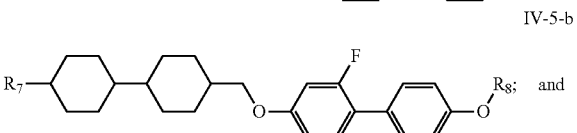
and

IV-5-c
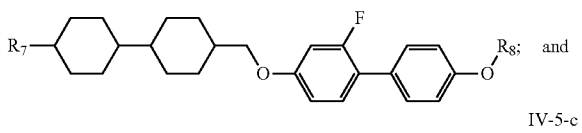

wherein $R_7$ and $R_8$ are the same or different, and each independently represents an alkyl group having a carbon atom number of 1 to 5.

The compound of general formula V-1 is preferably one or more compounds selected from the group consisting of the following compounds:

V-1-a
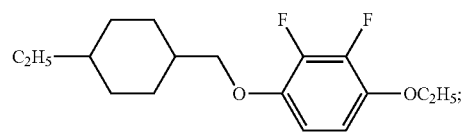

-continued

V-1-b
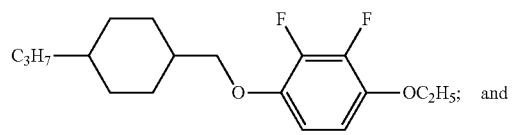
and

V-1-c
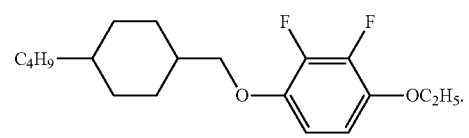

The compound of general formula V-2 is preferably one or more compounds selected from the group consisting of the following compounds:

V-2-a
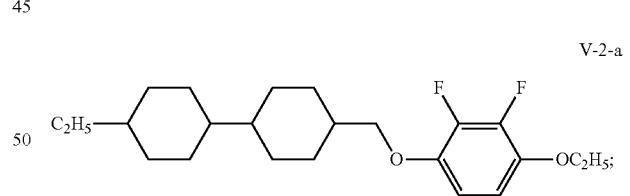

V-2-b
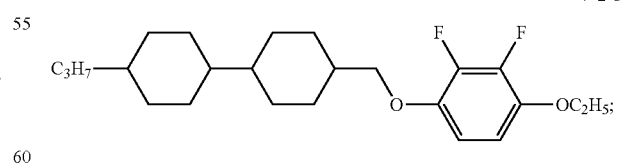

V-2-c
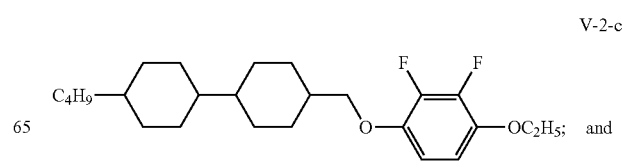
and

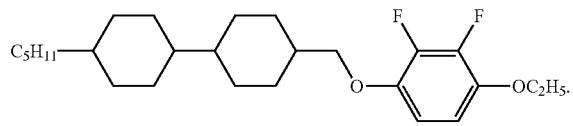
V-2-d

The compound of general formula VI is preferably one or more compounds selected from the group consisting of the following compounds:

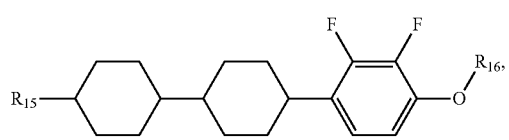
VI-1 wherein $R_{15}$ and $R_{16}$ are the same or different, and each independently represents an alkyl group having a carbon atom number of 1 to 5.

As a preferred solution, in the liquid crystal composition provided by the present invention, the compound of general formula III accounts for 10-30% of the total weight of said liquid crystal composition; the compound of general formula IV accounts for 3-20% of the total weight of said liquid crystal composition; the compound of general formula V-1 and/or general formula V-2 accounts for 12-30% of the total weight of said liquid crystal composition; and the compound of general formula VI-1 accounts for 3-18% of the total weight of said liquid crystal composition.

As a particularly preferred solution, the compound of general formula VI-1 accounts for 5-15% of the total weight of said liquid crystal composition.

The present invention further provides a mixture comprising the foregoing liquid crystal composition and one or more polymerizable liquid crystal compounds complying with the following formula RM:

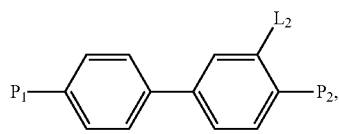
RM wherein $P_1$ and $P_2$ are the same or different, and each independently represents

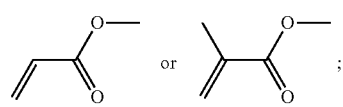

$L_2$ represents H or F.

The polymerizable compound of formula RM is preferably one or more compounds selected from the group consisting of the following compounds:

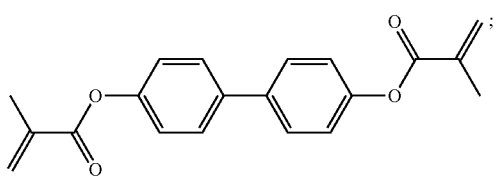
RM1

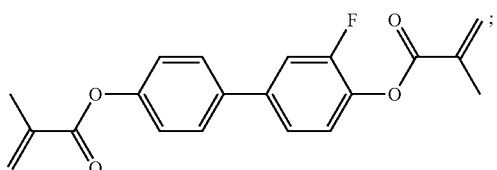
RM2

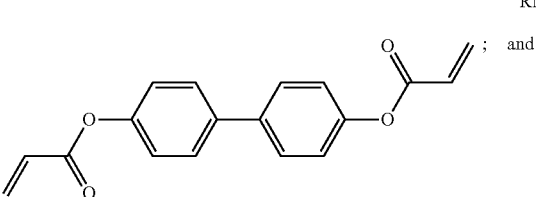
RM3 and

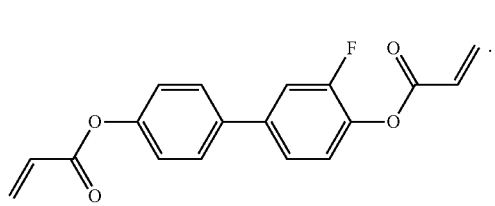
RM4

The present invention further provides a liquid crystal display comprising the liquid crystal composition provided by the present invention or the mixture provided by the present invention.

Using the above-mentioned technical solution, the present invention, as compared with the prior art, has achieved the technical progress including:

The liquid crystal composition provided by the present invention has an appropriate optical anisotropy, an appropriate dielectric anisotropy, a higher clearing point, a broader nematic phase temperature range, a good UV-resistant stability and a strong pretilt angle-forming ability, and is applicable to a liquid crystal display device, so that the liquid crystal display device has a characteristic of enabling a good display under UV illumination. Moreover, the liquid crystal composition provided by the present invention has a better pretilt angle forming ability, enabling a polymer-stabilized vertical alignment display element to have a better optical effect, the liquid crystal composition of the present invention has a better VHR value after UV illumination, and the liquid crystal display device using the liquid crystal composition of the present invention has a better stability.

In the present invention, unless otherwise specified herein, said percentages are all percentages by weight, said temperatures are all Celsius temperatures, and said cell thickness selected for a response time data test is 7 μm.

DETAILED DESCRIPTION OF THE INVENTION

The present invention will be illustrated in conjunction with particular embodiments. It should be noted that the following embodiments are examples of the present invention, and are merely used for describing rather than limiting the present invention. Without departing from the subject matter or scope of the present invention, other combinations or various modifications can be made within the concept of the present invention.

For the ease of expression, in the following embodiments, group structures of the liquid crystal composition are represented by codes listed in table 1:

TABLE 1

Codes of group structures of the liquid crystal composition

| Unit structure of a group | Code | Group name |
|---|---|---|
| (cyclohexane ring) | C | 1,4-cyclohexylene |
| (benzene ring) | P | 1,4-phenylene |
| (cyclopentane ring) | C(5) | Cyclopentyl |
| (2,3-difluorobenzene) | W | 2,3-difluoro-1,4-phenylene |
| —O— | O | Oxygen substituent |
| —CH$_2$O— | 1O | Methyleneoxy |
| —CH$_2$CH$_2$— | 2 | Ethylidene |
| —CH═CH— | V | Alkenyl |
| —C$_n$H$_{2n-1}$ or —C$_m$H$_{2m-1}$ | n or m | Alkyl |

Taking a compound of the following structure formula for example:

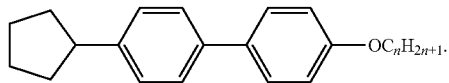

if expressed by the codes listed in table 1, the structure formula can be expressed as: C(5)PPOn, wherein n in the code represents the number of C atoms of an alkyl group on the right end, for example, n is "3", i.e. indicating that the alkyl group is —C$_3$H$_7$; C(5) in the code represents cyclopentyl; P in the code represents 1,4-phenylene; and O in the code represents an oxygen substituent.

Abbreviated codes of test items in the following embodiments are as follows:

Cp(° C.): clearing point (nematic-isotropic phase transition temperature)

Δn: optical anisotropy (589 nm, 20° C.)

Δε: dielectric anisotropy (1 KHz, 25° C.)

VHR (initial): voltage holding ratio (%)

VHR (UV, 15 min): Voltage holding ratio after irradiation with a UV lamp for 15 min (%)

wherein the refractive index anisotropy is measured using an Abbe refractometer with a light source of sodium lamp (589 nm) at 20° C.; and the dielectric test cell is of TN90 type, and has a cell thickness of 7 μm.

Δε=εμ−ε⊥, wherein ε∥ is a dielectric constant parallel to a molecular axis, ε⊥ is a dielectric constant perpendicular to the molecular axis, and the test conditions are: 25° C., 1 KHz, and a dielectric test cell of TN90 type having a cell thickness of 7 μm.

The VHR (initial) is measured using a TOY06254 type liquid crystal physical property evaluation system; and the test temperature is 60° C., the test voltage is 5 V, and the test time is 166.7 ms. The VHR (UV) is measured using the TOY06254 type liquid crystal physical property evaluation system after irradiation for 15 min with a UV lamp having an intensity of 5.8 mw/cm$^2$ at 365 nm; and the test temperature is 60° C., the test voltage is 5 V, and the test time is 166.7 ms.

Various components adopted in the following embodiments can all be synthesized by well-known methods or obtained through commercial approaches. These synthesis techniques are conventional, and the obtained liquid crystal compounds comply with standards of electronic compounds after measurement.

Liquid crystal compositions are prepared according to the proportions of the various liquid crystal compositions specified in the following embodiments. The preparation of said liquid crystal compositions is carried out according to conventional methods in the art, such as heating, ultrasonic wave, suspension, etc., according to the specified proportions.

Comparative Example 1

A liquid crystal composition M1 of comparative example 1 is formulated according to various compounds and weight percentages listed in table 2, and is filled between two substrates of a liquid crystal display for performance test, the test data being as shown in the following table:

TABLE 2

Formulation and testing performance of the liquid crystal composition

| Monomer name | Compound type | Weight percentage | Performance parameter | test result |
|---|---|---|---|---|
| 5CCV | | 13 | Cp | 81.7 |
| V2PP1 | | 5 | Δn | 0.107 |
| 3CCV1 | | 9 | Δε | −3.0 |
| VCCP1 | | 9 | VHR (initial) | 97.3% |
| 3CPP2 | | 4 | VHR (UV, 15 mm) | 84.1% |
| 3CWO4 | | 16 | | |
| 5CWO2 | | 12 | | |
| 3CCWO2 | VI-1 | 6 | | |
| 3CCWO3 | VI-1 | 4 | | |
| 3CPWO2 | III-8 | 8 | | |
| 3PWP2 | | 4 | | |
| 3CCW1 | VI | 5 | | |
| 2CCW1 | VI | 5 | | |
| Total | | 100 | | |

Comparative Example 2

A liquid crystal composition M2 of comparative example 2 is formulated according to various compounds and weight percentages listed in table 3, and is filled between two substrates of a liquid crystal display for performance test, the test data being as shown in the following table:

TABLE 3

Formulation and testing performance of the liquid crystal composition

| Monomer name | Compound type | Weight percentage | Performance parameter | test result |
|---|---|---|---|---|
| 3CC2 | I-1 | 13 | Cp | 81.2 |
| 5PP1 | I-4 | 5 | Δn | 0.108 |
| 4CC3 | I-2 | 9 | Δε | −3.0 |
| 3CCP1 |  | 5 | VHR (initial) | 97.5% |
| 3CPP2 |  | 8 | VHR (UV, 15 min) | 94.0% |
| 3CWO4 |  | 15 |  |  |
| 5CWO2 |  | 10 |  |  |
| 3CCWO2 | VI-1 | 6 |  |  |
| 3CCWO3 | VI-1 | 7 |  |  |
| 3CPWO2 | III-8 | 8 |  |  |
| 3CPPC3 |  | 4 |  |  |
| 3CCW1 | VI | 5 |  |  |
| 2CCW1 | VI | 5 |  |  |
| Total |  | 100 |  |  |

Example 1

A liquid crystal composition N1 of example 1 is formulated according to various compounds and weight percentages listed in table 4, and is filled between two substrates of a liquid crystal display for performance test, the test data being as shown in the following table:

TABLE 4

Formulation and testing performance of the liquid crystal composition

| Monomer name | Compound type | Weight percentage | Performance parameter | test result |
|---|---|---|---|---|
| 3CC2 | I-1 | 20 | Cp | 81.2 |
| 4CC3 | I-2 | 5 | Δn | 0.107 |
| 3PP2 | II-2 | 6 | Δε | −3.1 |
| 5PP1 | II-4 | 8 | VHR (initial) | 97.3% |
| 3PPO2 | IV-1-c | 6 | VHR (UV, 15 min) | 94.6% |
| 3PPO4 | IV-1-c | 2 |  |  |
| 2CPWO2 | III-7 | 5 |  |  |
| 3CPWO2 | III-8 | 10 |  |  |
| 3CCWO2 | VI-1 | 4 |  |  |
| 4CCWO2 | VI-1 | 4 |  |  |
| 3C1OWO2 | V-1-b | 5 |  |  |
| 2CC1OWO2 | V-2-a | 7 |  |  |
| 3CC1OWO2 | V-2-b | 18 |  |  |
| Total |  | 100 |  |  |

Example 2

A liquid crystal composition N2 of example 2 is formulated according to various compounds and weight percentages listed in table 5, and is filled between two substrates of a liquid crystal display for performance test, the test data being as shown in the following table:

TABLE 5

Formulation and testing performance of the liquid crystal composition

| Monomer name | Compound type | Weight percentage | Performance parameter | test result |
|---|---|---|---|---|
| 3CC2 | I-1 | 20 | Cp | 81.8 |
| 4CC3 | I-2 | 6 | Δn | 0.11 |

TABLE 5-continued

Formulation and testing performance of the liquid crystal composition

| Monomer name | Compound type | Weight percentage | Performance parameter | test result |
|---|---|---|---|---|
| 3PP2 | II-2 | 6 | Δε | −2.9 |
| 3PPO2 | IV-1-c | 6 | VHR (initial) | 97.5% |
| 3PPO4 | IV-1-c | 4 | VHR (UV, 15 min) | 94.3% |
| 3CPPO2 | IV-1-c | 3 |  |  |
| 3C1OPP2 | IV-2-e | 2 |  |  |
| 2CPWO2 | III-7 | 5 |  |  |
| 3CPWO2 | III-8 | 10 |  |  |
| 3CPWO4 | III-9 | 8 |  |  |
| 3CCWO2 | VI-1 | 4 |  |  |
| 4CCWO2 | VI-1 | 4 |  |  |
| 3C1OWO2 | V-1-b | 11 |  |  |
| 2CC1OWO2 | V-2-a | 5 |  |  |
| 3CC1OWO2 | V-2-b | 6 |  |  |
| Total |  | 100 |  |  |

Example 3

A liquid crystal composition N3 of example 3 is formulated according to various compounds and weight percentages listed in table 6, and is filled between two substrates of a liquid crystal display for performance test, the test data being as shown in the following table:

TABLE 6

Formulation and testing performance of the liquid crystal composition

| Monomer name | Compound type | Weight percentage | Performance parameter | test result |
|---|---|---|---|---|
| 3CC2 | I-1 | 23 | Cp | 82.3 |
| 4CC3 | I-2 | 7 | Δn | 0.106 |
| 5CC2 | I-3 | 3 | Δε | −3.1 |
| 3PP2 | II-2 | 4 | VHR (initial) | 97.3% |
| 3PPO2 | IV-1-c | 6 | VHR (UV, 15 min) | 94.4% |
| 2CPWO2 | III-7 | 7 |  |  |
| 3CPWO2 | III-8 | 10 |  |  |
| 3CPWO4 | III-9 | 11 |  |  |
| 3CCWO2 | VI-1 | 4 |  |  |
| 4CCWO2 | VI-1 | 5 |  |  |
| 3CCWO3 | VI-1 | 5 |  |  |
| 3C1OWO2 | V-1-b | 10 |  |  |
| 2CC1OWO2 | V-2-a | 2 |  |  |
| 3CC1OWO2 | V-2-b | 3 |  |  |
| Total |  | 100 |  |  |

Example 4

A liquid crystal composition N4 of example 4 is formulated according to various compounds and weight percentages listed in table 7, and is filled between two substrates of a liquid crystal display for performance test, the test data being as shown in the following table:

TABLE 7

Formulation and testing performance of the liquid crystal composition

| Monomer name | Compound type | Weight percentage | Performance parameter test result | |
|---|---|---|---|---|
| 3CC2 | I-1 | 12 | Cp | 81.2 |
| 4CC3 | I-2 | 5 | Δn | 0.113 |
| 3PP2 | II-2 | 6 | Δε | −3.2 |
| 5PP1 | II-4 | 8 | VHR (initial) | 97.6% |
| 3PPO2 | IV-1-c | 6 | VHR (UV, 15 min) | 94.5% |
| 3PPO4 | IV-1-c | 5 | | |
| (C5)PPO2 | IV-3-a | 3 | | |
| (C5)PPO4 | IV-3-a | 3 | | |
| 2CPWO2 | III-7 | 3 | | |
| 3CPWO2 | III-8 | 3 | | |
| 3CCWO2 | VI-1 | 6 | | |
| 4CCWO2 | VI-1 | 4 | | |
| 5CCWO2 | VI-1 | 3 | | |
| 3C1OWO2 | V-1-b | 7 | | |
| 2CC1OWO2 | V-2-a | 7 | | |
| 3CC1OWO2 | V-2-b | 9 | | |
| 4CC1OWO2 | V-2-c | 5 | | |
| 5CC1OWO2 | V-2-d | 5 | | |
| Total | | 100 | | |

Example 5

A liquid crystal composition N5 of example 5 is formulated according to various compounds and weight percentages listed in table 8, and is filled between two substrates of a liquid crystal display for performance test, the test data being as shown in the following table:

TABLE 8

Formulation and testing performance of the liquid crystal composition

| Monomer name | Compound type | Weight percentage | Performance parameter test result | |
|---|---|---|---|---|
| 3CC2 | I-1 | 12 | Cp | 82.5 |
| 4CC3 | I-2 | 5 | Δn | 0.111 |
| 3PP2 | II-2 | 7 | Δε | −3.0 |
| 5PP1 | II-4 | 12 | VHR (initial) | 97.6% |
| 3PPO2 | IV-1-c | 3 | VHR (UV, 15 min) | 94.4% |
| 3PPO4 | IV-1-c | 3 | | |
| (C5)PPO2 | IV-3-a | 3 | | |
| (C5)PPO4 | IV-3-a | 3 | | |
| 2CPWO2 | III-7 | 3 | | |
| 3CPWO2 | III-8 | 3 | | |
| 3CCWO2 | VI-1 | 6 | | |
| 4CCWO2 | VI-1 | 5 | | |
| 5CCWO2 | VI-1 | 4 | | |
| 3CCWO3 | VI-1 | 4 | | |
| 3C1OWO2 | V-1-b | 7 | | |
| 2CC1OWO2 | V-2-a | 5 | | |
| 3CC1OWO2 | V-2-b | 7 | | |
| 4CC1OWO2 | V-2-c | 4 | | |
| 5CC1OWO2 | V-2-d | 4 | | |
| Total | | 100 | | |

Example 6

A liquid crystal composition N6 of example 6 is formulated according to various compounds and weight percentages listed in table 9, and is filled between two substrates of a liquid crystal display for performance test, the test data being as shown in the following table:

TABLE 9

Formulation and testing performance of the liquid crystal composition

| Monomer name | Compound type | Weight percentage | Performance parameter test result | |
|---|---|---|---|---|
| 3CC2 | I-1 | 23 | Cp | 83.3 |
| 4CC3 | I-2 | 7 | Δn | 0.101 |
| 5CC2 | I-3 | 4 | Δε | −3.1 |
| 3PP2 | II-2 | 4 | VHR (initial) | 97.3% |
| 3PPO2 | IV-1-c | 3 | VHR (UV, 15 min) | 94.8% |
| 2CPWO2 | III-7 | 7 | | |
| 3CPWO2 | III-8 | 10 | | |
| 3CPWO4 | III-9 | 11 | | |
| 3CCWO2 | VI-1 | 5 | | |
| 4CCWO2 | VI-1 | 5 | | |
| 3CCWO3 | VI-1 | 5 | | |
| 3C1OWO2 | V-1-b | 11 | | |
| 2CC1OWO2 | V-2-a | 2 | | |
| 3CC1OWO2 | V-2-b | 3 | | |
| Total | | 100 | | |

It can be seen from the data of the above embodiments that the liquid crystal composition provided by the present invention has an appropriate optical anisotropy, an appropriate dielectric anisotropy, a broader nematic phase temperature range, and a higher clearing point, and can be applied to a liquid crystal display. In addition, compared with comparative examples 1 and 2, when the optical anisotropy values, the dielectric anisotropy values and the clearing points are close, the liquid crystal composition provided by the present invention has a better UV-resistant stability, and achieves obvious technical progress.

Example 7

0.3% of RM1 is added to the above-mentioned liquid crystal compositions M1, M2, N1, N2, N3, N4, N5 and N6, respectively:

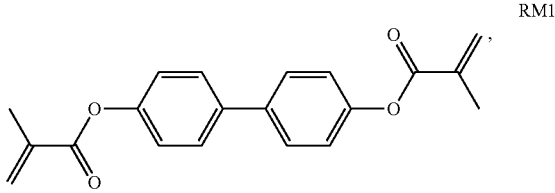 [SMILES: C=C(C)C(=O)Oc1ccc(-c2ccc(OC(=O)C(=C)C)cc2)cc1]

RM1

Mixtures M1RM1, M2RM1, N1RM1, N2RM1, N3RM1, N4RM1, N5RM1 and N6RM1 are obtained, the pretilt angle and VHR before and after UV illumination are measured, and the experimental results are shown in the following table:

TABLE 10

Pretilt angle before and after UV illumination

| Mixture | Pretilt angle before UV illumination (°) | Pretilt angle after UV illumination (°) |
|---|---|---|
| M1RM1 | 89 | 88.1 |
| M2RM1 | 89 | 87.8 |
| N1RM1 | 89 | 84.8 |
| N2RM1 | 89 | 83.1 |
| N3RM1 | 89 | 84.9 |
| N4RM1 | 89 | 82.7 |

TABLE 10-continued

Pretilt angle before and after UV illumination

| Mixture | Pretilt angle before UV illumination (°) | Pretilt angle after UV illumination (°) |
|---|---|---|
| N5RM1 | 89 | 83.4 |
| N6RM1 | 89 | 85.3 |

TABLE 11

VHR before and after UV illumination

| Mixture | VHR before UV illumination (%) | VHR after UV illumination (%) |
|---|---|---|
| M1RM1 | 96.9 | 86.6 |
| M2RM1 | 97 | 97.1 |
| N1RM1 | 97 | 97.8 |
| N2RM1 | 96.9 | 98.3 |
| N3RM1 | 96.8 | 98 |
| N4RM1 | 97.3 | 98.8 |
| N5RM1 | 97.2 | 98.3 |
| N6RM1 | 96.8 | 97.7 |

Example 8

0.3% of RM2 is added to the above-mentioned liquid crystal compositions M1, M2, N1, N2, N3, N4, N5 and N6, respectively:

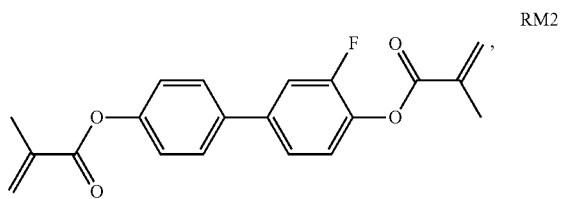 [SMILES: C=C(C)C(=O)Oc1ccc(-c2ccc(OC(=O)C(=C)C)c(F)c2)cc1]

Mixtures M1RM2, M2RM2, N1RM2, N2RM2, N3RM2, N4RM2, N5RM2 and N6RM2 are obtained, the pretilt angle and VHR before and after UV illumination are measured, and the experimental results are shown in the following table:

TABLE 12

Pretilt angle before and after UV illumination

| Mixture | Pretilt angle before UV illumination (°) | Pretilt angle after UV illumination (°) |
|---|---|---|
| M1RM2 | 89 | 88.8 |
| M2RM2 | 89 | 88.3 |
| N1RM2 | 89 | 85.4 |
| N2RM2 | 89 | 83.6 |
| N3RM2 | 89 | 85.4 |
| N4RM2 | 89 | 83.1 |
| N5RM2 | 89 | 83.6 |
| N6RM2 | 89 | 85.7 |

TABLE 13

VHR before and after UV illumination

| Mixture | VHR before UV illumination (%) | VHR after UV illumination (%) |
|---|---|---|
| M1RM2 | 96.9 | 85.1 |
| M2RM2 | 97 | 97.1 |
| N1RM2 | 97 | 97.7 |
| N2RM2 | 96.9 | 98 |
| N3RM2 | 96.8 | 97.9 |
| N4RM2 | 97.3 | 98.6 |
| N5RM2 | 97.2 | 98.3 |
| N6RM2 | 96.8 | 97.5 |

Likewise, the experimental results indicate that after 0.3% of RM3 and 0.3% of RM4 are added into N1, N2, N3, N4, N5 and N6, respectively, they likewise have a very good pretilt angle forming ability, and a better VHR value and pretilt angle forming ability after UV illumination.

It is indicated from the data of the above examples that the liquid crystal composition provided by the present invention as compared to the prior art has a better pretilt angle forming ability, enabling a polymer-stabilized vertical alignment display element to have a better optical effect, the liquid crystal composition of the present invention has a better VHR value after UV illumination, and the liquid crystal display device using the liquid crystal composition of the present invention has a better stability, achieving very good technical progress.

The above embodiments are merely used for illustrating the technical concept and features of the present invention, and the purpose thereof lies in allowing those who are familiar to this technique to understand and implement the contents of the present invention, without limiting the scope of protection of the present invention; and any variations or modifications made according to the spirit of the present invention should all be included within the scope of the present invention.

What is claimed is:

1. A liquid crystal composition having a negative dielectric anisotropy, comprising:

15-35% by weight of a compound of general formula I,

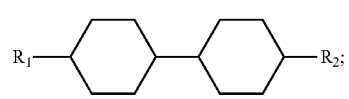

3-20% by weight of a compound of general formula II,

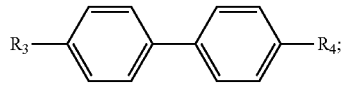

5-30% by weight of a compound of general formula III,

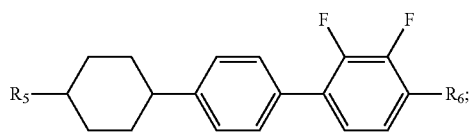

1-20% by weight of a compound of general formula IV,

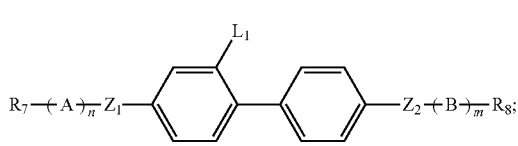

10-35% by weight of a compound of general formula V-1 and/or a compound of general formula V-2,

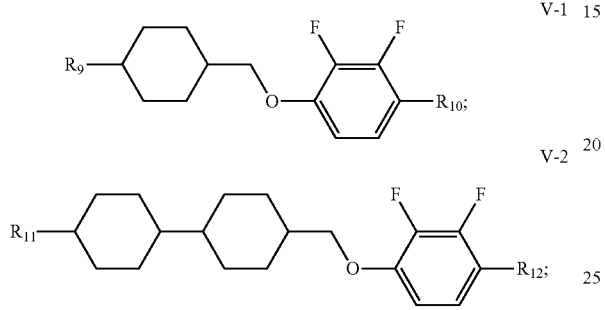

and
1-25% by weight of a compound of general formula VI,

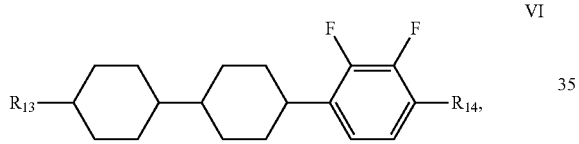

wherein
$R_1$, $R_2$, $R_3$, $R_4$, $R_5$, $R_9$, $R_{11}$ and $R_{13}$ are the same or different and each independently represents an alkyl group having a carbon atom number of 1 to 5;
$R_6$, $R_{10}$, $R_{12}$ and $R_{14}$ are the same or different, and each independently represents an alkyl group having a carbon atom number of 1 to 5 or an alkoxy group having a carbon atom number of 1 to 5;
$R_7$ and $R_8$ are the same or different, and each independently represents H or an alkyl group having a carbon atom number of 1 to 10, wherein one or more non-adjacent $CH_2$ groups may be replaced by —O—, —CO—, —COO—, —OCO—O— or —OCO—, the oxygen atoms are not directly connected, and one or more H atoms can be replaced by fluorine;
$L_1$ represents H or F;
$Z_1$ and $Z_2$ are the same or different, and each independently represents —$CH_2$O—, —O$CH_2$—, —O—, —$CH_2CH_2$— or a single bond, and at least one of $Z_1$ and $Z_2$ is —$CH_2$O—, —O$CH_2$— or —O—;
A and B are the same or different, and each independently represents 1,4-cyclohexylene or 1,3-cyclopentylene, wherein one or more non-adjacent $CH_2$ groups may be replaced by —O—; and
m and n are the same or different, and each independently represents 0, 1 or 2, with n+m≤2.

2. The liquid crystal composition having a negative dielectric anisotropy according to claim 1, wherein the compound of general formula I is one or more compounds selected from the group consisting of the following compounds:

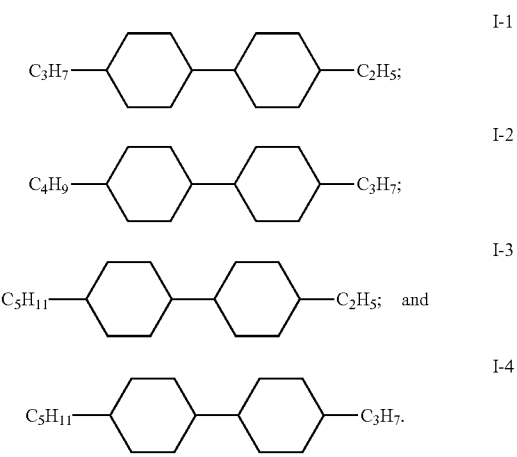

3. The liquid crystal composition having a negative dielectric anisotropy according to claim 1, wherein the compound of general formula II is one or more compounds selected from the group consisting of the following compounds:

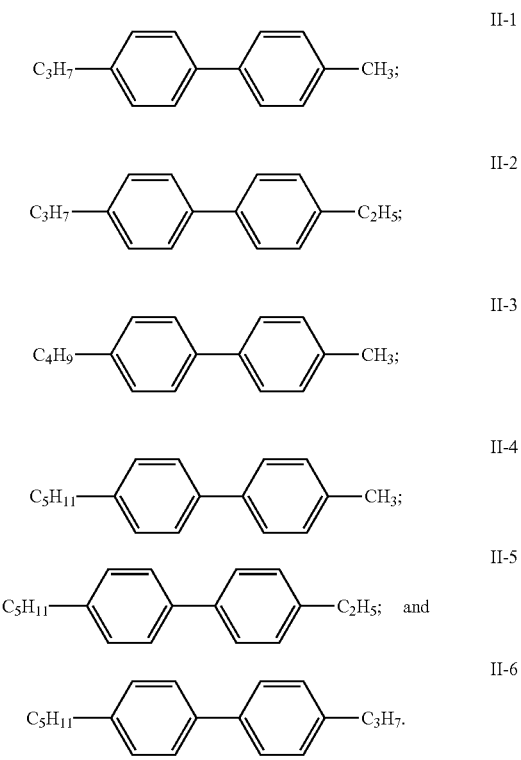

4. The liquid crystal composition having a negative dielectric anisotropy according to claim 1, wherein the compound of general formula III is one or more compounds selected from the group consisting of the following compounds:

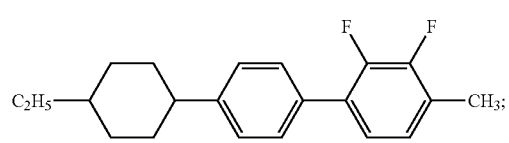 III-1

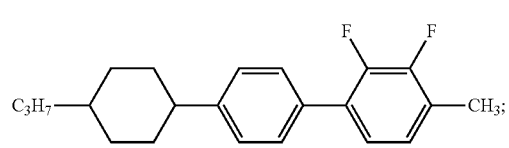 III-2

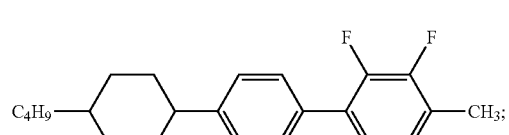 III-3

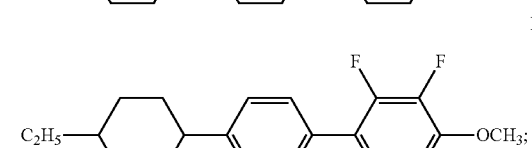 III-4

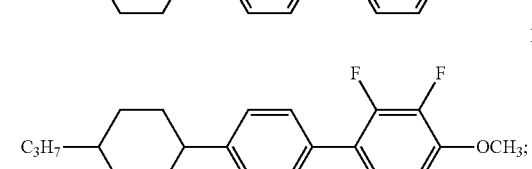 III-5

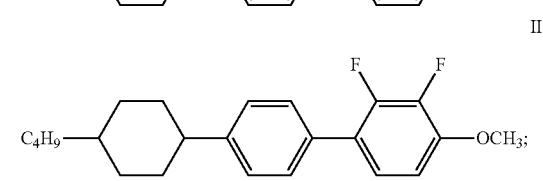 III-6

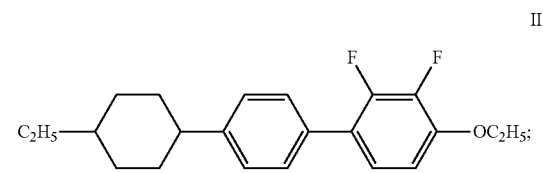 III-7

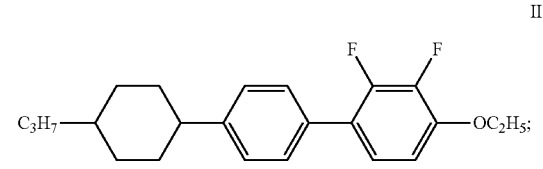 III-8

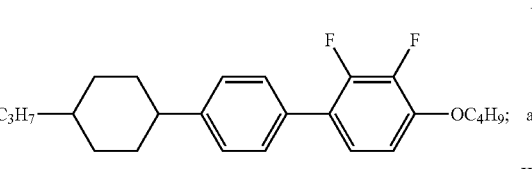 III-9; and

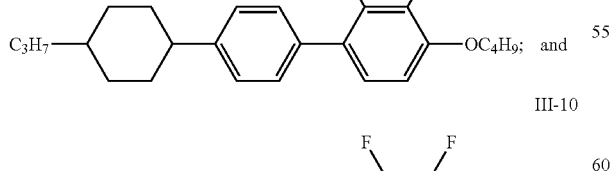 III-10

5. The liquid crystal composition having a negative dielectric anisotropy according to claim 1, wherein the compound of general formula IV is one or more compounds selected from the group consisting of the following compounds:

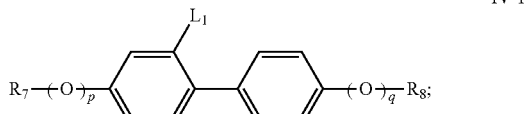 IV-1

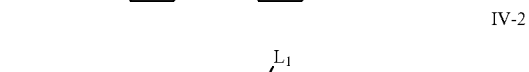 IV-2

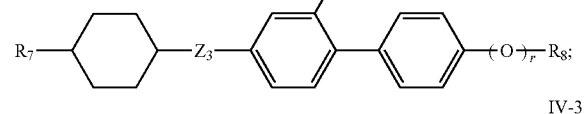 IV-3

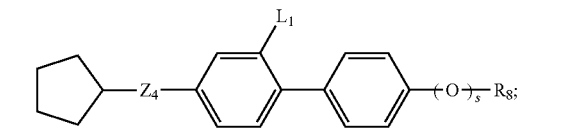 IV-4

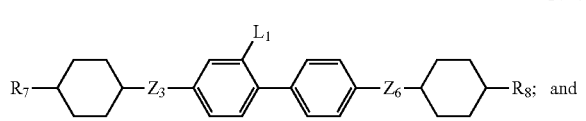 IV-5; and

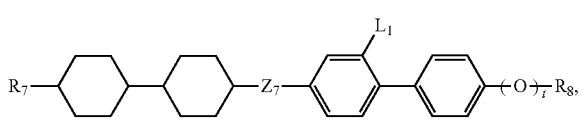

wherein
- $R_7$ and $R_8$ are the same or different, and each independently represents an alkyl group having a carbon atom number of 1 to 10, wherein one or more H atoms can be replaced by fluorine;
- $L_1$ represents H or F;
- $Z_3$, $Z_4$, $Z_5$, $Z_6$ and $Z_7$ are the same or different, and each independently represents —CH$_2$O—, —OCH$_2$—, —O—, —CH$_2$CH$_2$— or a single bond;
- p, q, r, s and t are the same or different, and each independently represents 0 or 1, with p+q≥1.

6. The liquid crystal composition having a negative dielectric anisotropy according to claim 1, wherein the compound of general formula VI is one or more compounds selected from the group consisting of the following compounds:

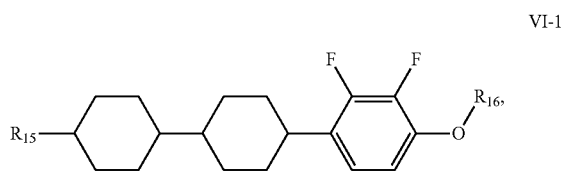 VI-1 wherein
- $R_{15}$ and $R_{16}$ are the same or different, and each independently represents an alkyl group having a carbon atom number of 1 to 5.

7. The liquid crystal composition having a negative dielectric anisotropy according to claim 5, wherein the compound of general formula IV-1 is one or more compounds selected from the group consisting of the following compounds:

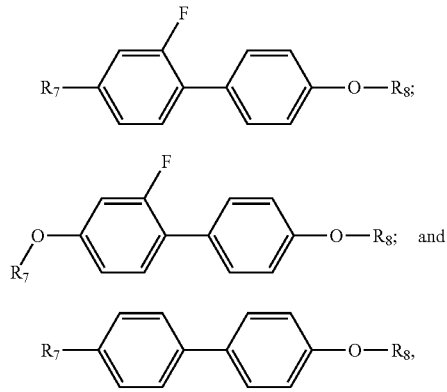

IV-1-a

IV-1-b

IV-1-c the compound of general formula IV-2 is one or more compounds selected from the group consisting of the following compounds:

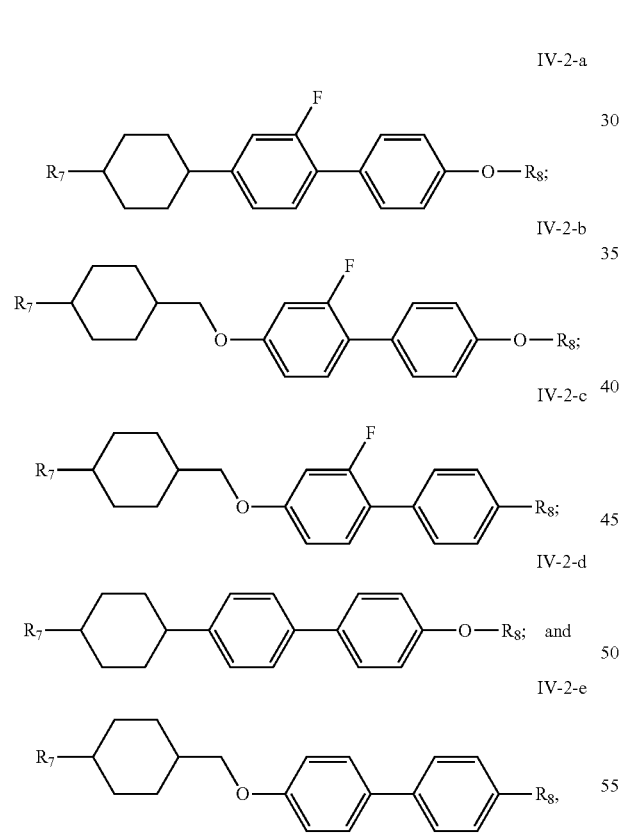

IV-2-a

IV-2-b

IV-2-c

IV-2-d

IV-2-e the compound of general formula IV-3 is one or more compounds selected from the group consisting of the following compounds:

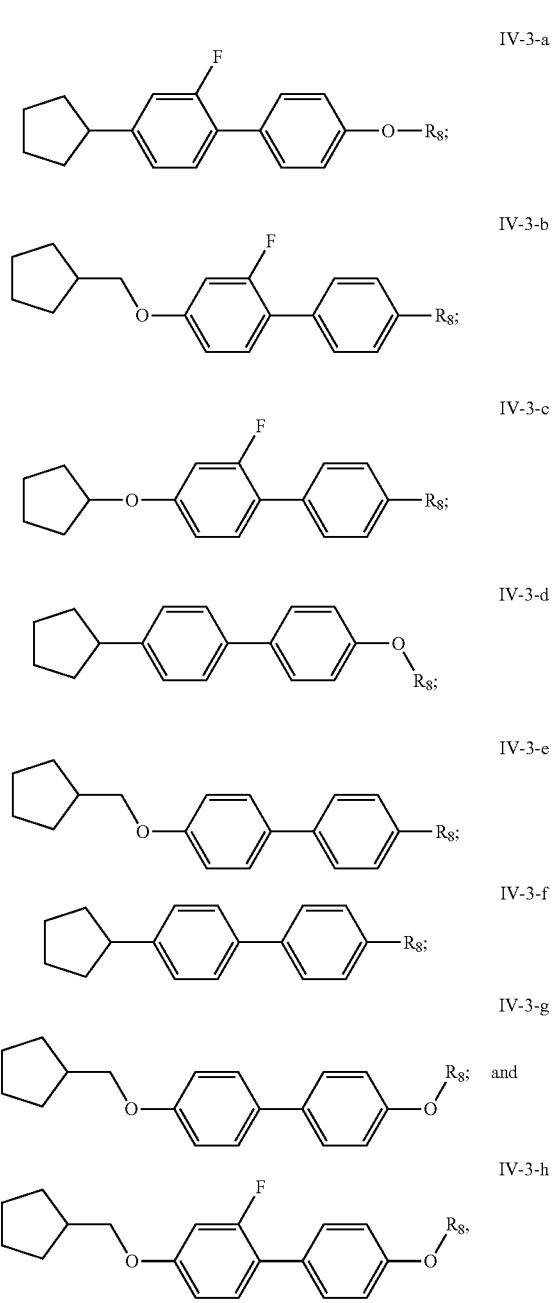

IV-3-a

IV-3-b

IV-3-c

IV-3-d

IV-3-e

IV-3-f

IV-3-g

IV-3-h the compound of general formula IV-4 is one or more compounds selected from the group consisting of the following compounds:

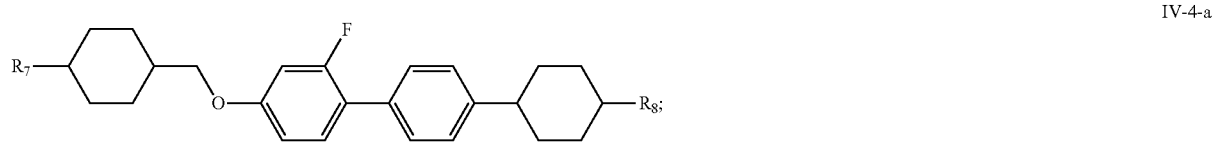

IV-4-a

-continued

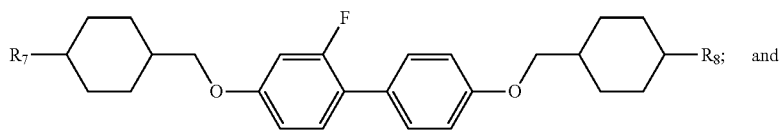
IV-4-b

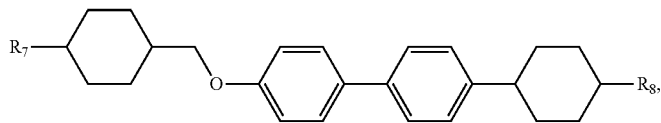
IV-4-c and
the compound of general formula IV-5 is one or more compounds selected from the group consisting of the following compounds:

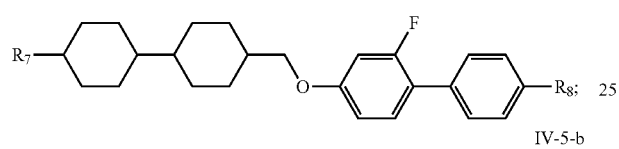
IV-5-a

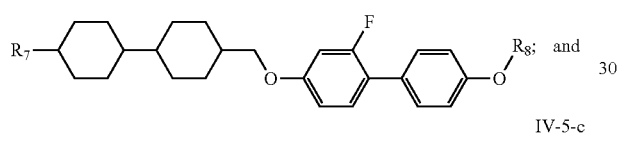
IV-5-b

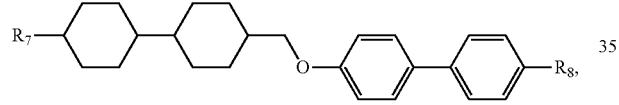
IV-5-c wherein
R$_7$ and R$_8$ are the same or different, and each independently represents an alkyl group having a carbon atom number of 1 to 5.

8. The liquid crystal composition having a negative dielectric anisotropy according to claim 1, wherein the compound of general formula III accounts for 10-30% of the total weight of said liquid crystal composition; the compound of general formula IV accounts for 3-20% of the total weight of said liquid crystal composition; the compound of general formula V-1 and/or general formula V-2 accounts for 12-30% of the total weight of said liquid crystal composition; and the compound of general formula VI-1 accounts for 3-18% of the total weight of said liquid crystal composition.

9. The liquid crystal composition having a negative dielectric anisotropy according to claim 8, wherein the compound of general formula VI-1 accounts for 5-15% of the total weight of said liquid crystal composition.

10. The liquid crystal composition having a negative dielectric anisotropy according to claim 9, wherein said liquid crystal composition comprises:
a compound accounting for 20% of the total weight of said liquid crystal composition:

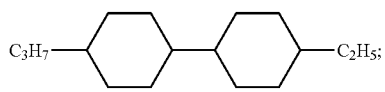

a compound accounting for 5% of the total weight of said liquid crystal composition:

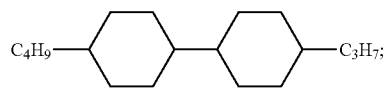

a compound accounting for 6% of the total weight of said liquid crystal composition:

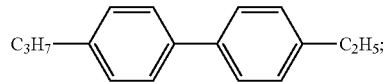

a compound accounting for 8% of the total weight of said liquid crystal composition:

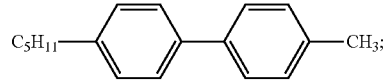

a compound accounting for 6% of the total weight of said liquid crystal composition:

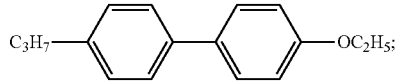

a compound accounting for 2% of the total weight of said liquid crystal composition:

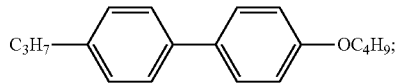

a compound accounting for 5% of the total weight of said liquid crystal composition:

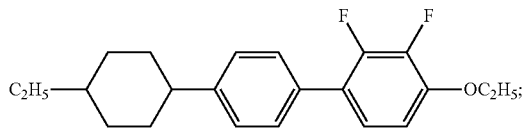

a compound accounting for 10% of the total weight of said liquid crystal composition:

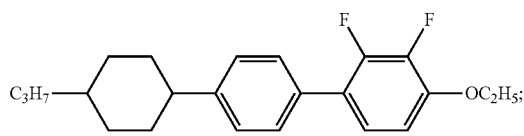

a compound accounting for 4% of the total weight of said liquid crystal composition:

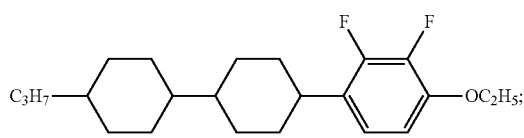

a compound accounting for 4% of the total weight of said liquid crystal composition:

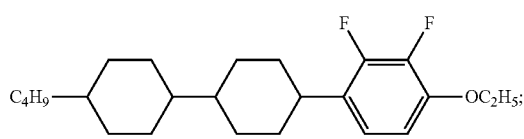

a compound accounting for 5% of the total weight of said liquid crystal composition:

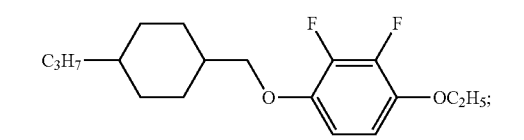

a compound accounting for 7% of the total weight of said liquid crystal composition:

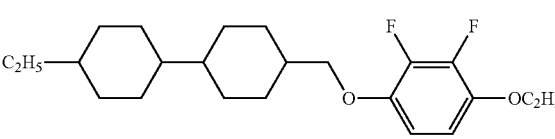

and a compound accounting for 18% of the total weight of said liquid crystal composition:

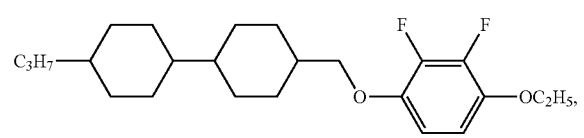

or said liquid crystal composition comprises:

a compound accounting for 20% of the total weight of said liquid crystal composition:

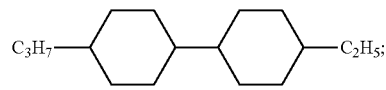

a compound accounting for 6% of the total weight of said liquid crystal composition:

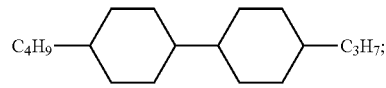

a compound accounting for 6% of the total weight of said liquid crystal composition:

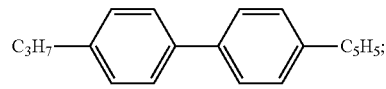

a compound accounting for 6% of the total weight of said liquid crystal composition:

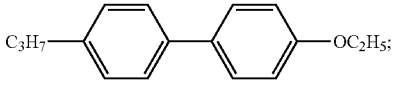

a compound accounting for 4% of the total weight of said liquid crystal composition:

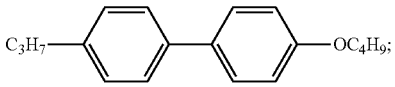

a compound accounting for 3% of the total weight of said liquid crystal composition:

a compound accounting for 2% of the total weight of said liquid crystal composition:

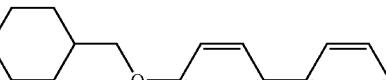

a compound accounting for 5% of the total weight of said liquid crystal composition:

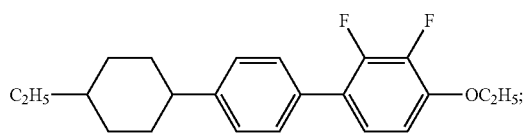

a compound accounting for 10% of the total weight of said liquid crystal composition:

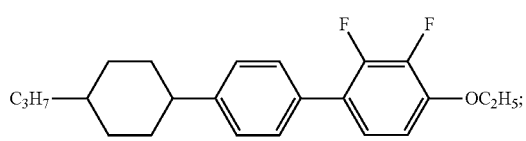

a compound accounting for 8% of the total weight of said liquid crystal composition:

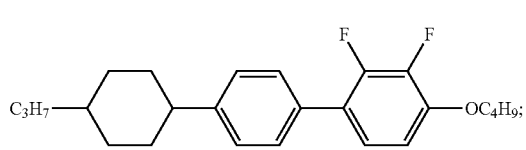

a compound accounting for 4% of the total weight of said liquid crystal composition:

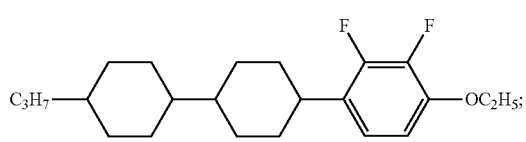

a compound accounting for 4% of the total weight of said liquid crystal composition:

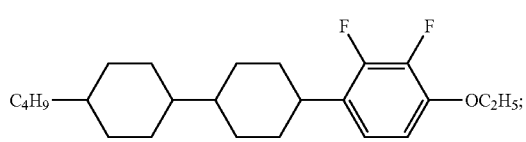

a compound accounting for 11% of the total weight of said liquid crystal composition:

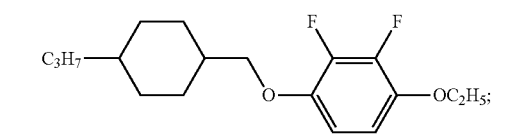

a compound accounting for 5% of the total weight of said liquid crystal composition:

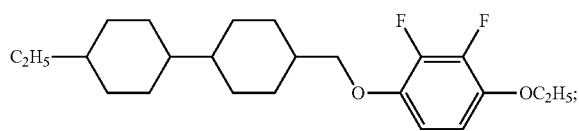

and
a compound accounting for 6% of the total weight of said liquid crystal composition:

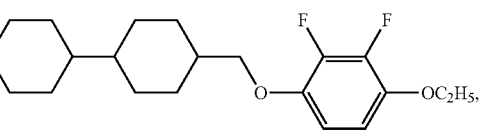

or said liquid crystal composition comprises:
a compound accounting for 23% of the total weight of said liquid crystal composition:

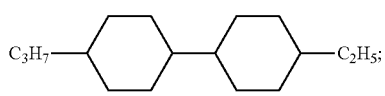

a compound accounting for 7% of the total weight of said liquid crystal composition:

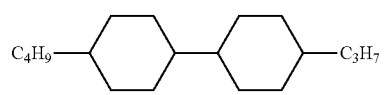

a compound accounting for 3% of the total weight of said liquid crystal composition:

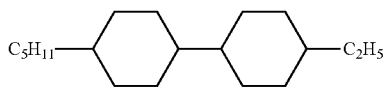

a compound accounting for 4% of the total weight of said liquid crystal composition:

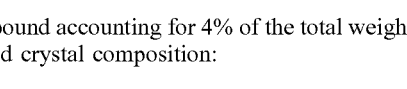

a compound accounting for 6% of the total weight of said liquid crystal composition:

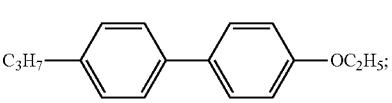

a compound accounting for 7% of the total weight of said liquid crystal composition:

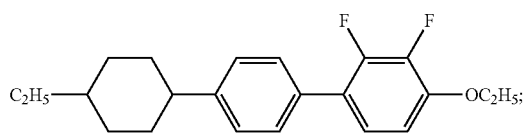

a compound accounting for 10% of the total weight of said liquid crystal composition:

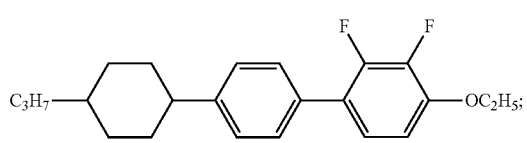

a compound accounting for 11% of the total weight of said liquid crystal composition:

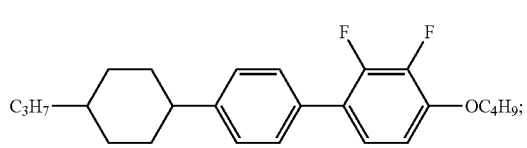

a compound accounting for 4% of the total weight of said liquid crystal composition:

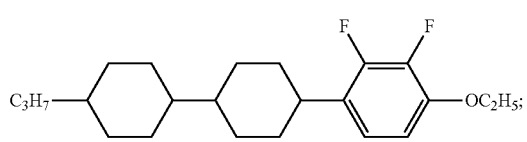

a compound accounting for 5% of the total weight of said liquid crystal composition:

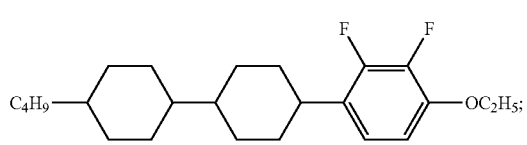

a compound accounting for 5% of the total weight of said liquid crystal composition:

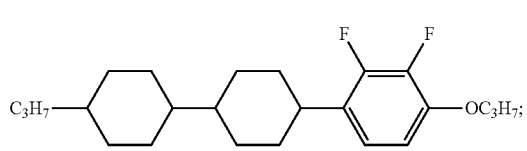

a compound accounting for 10% of the total weight of said liquid crystal composition:

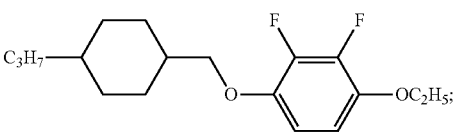

a compound accounting for 2% of the total weight of said liquid crystal composition:

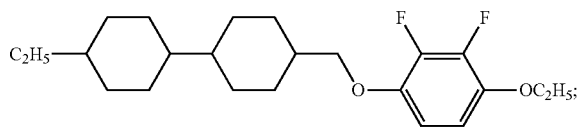

and
a compound accounting for 3% of the total weight of said liquid crystal composition:

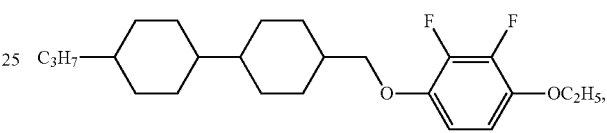

or said liquid crystal composition comprises:
a compound accounting for 12% of the total weight of said liquid crystal composition:

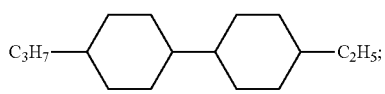

a compound accounting for 5% of the total weight of said liquid crystal composition:

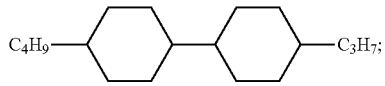

a compound accounting for 6% of the total weight of said liquid crystal composition:

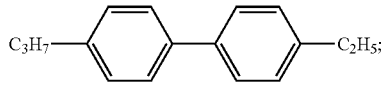

a compound accounting for 8% of the total weight of said liquid crystal composition:

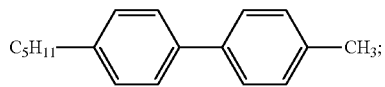

a compound accounting for 6% of the total weight of said liquid crystal composition:

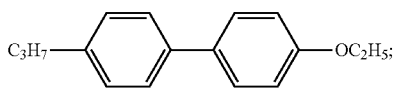

a compound accounting for 5% of the total weight of said liquid crystal composition:

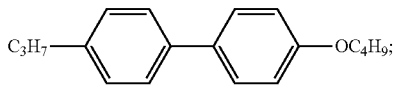

a compound accounting for 3% of the total weight of said liquid crystal composition:

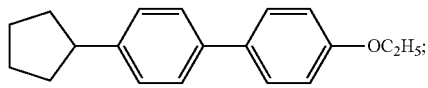

a compound accounting for 3% of the total weight of said liquid crystal composition:

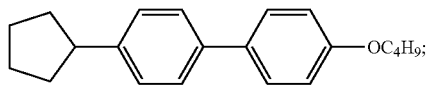

a compound accounting for 3% of the total weight of said liquid crystal composition:

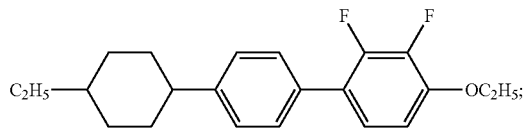

a compound accounting for 3% of the total weight of said liquid crystal composition:

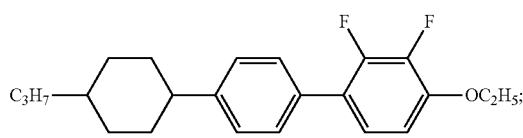

a compound accounting for 6% of the total weight of said liquid crystal composition:

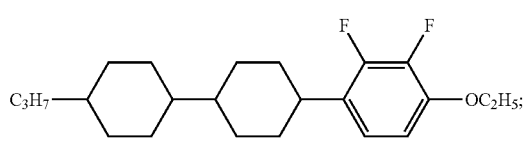

a compound accounting for 4% of the total weight of said liquid crystal composition:

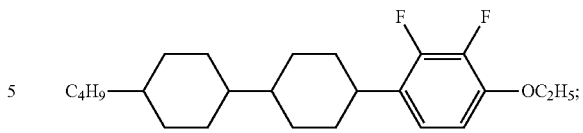

a compound accounting for 3% of the total weight of said liquid crystal composition:

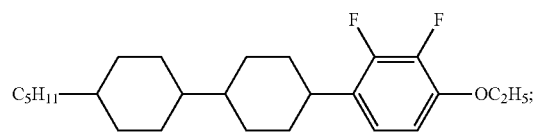

a compound accounting for 7% of the total weight of said liquid crystal composition:

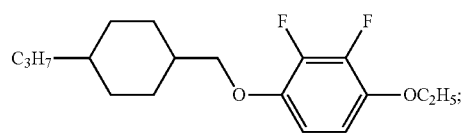

a compound accounting for 7% of the total weight of said liquid crystal composition:

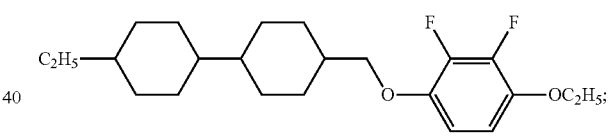

a compound accounting for 9% of the total weight of said liquid crystal composition:

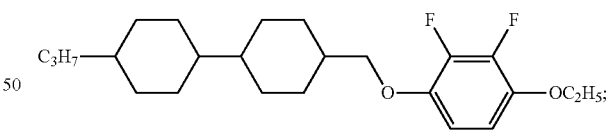

a compound accounting for 5% of the total weight of said liquid crystal composition:

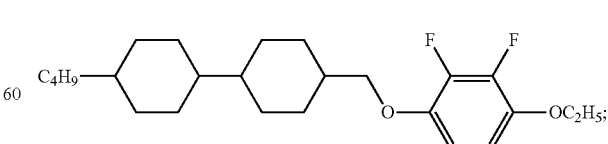

and a compound accounting for 5% of the total weight of said liquid crystal composition:

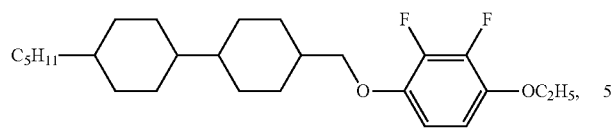

or said liquid crystal composition comprises:

a compound accounting for 12% of the total weight of said liquid crystal composition:

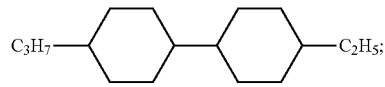

a compound accounting for 5% of the total weight of said liquid crystal composition:

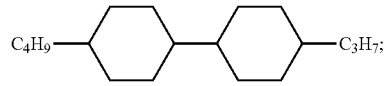

a compound accounting for 7% of the total weight of said liquid crystal composition:

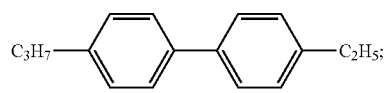

a compound accounting for 12% of the total weight of said liquid crystal composition:

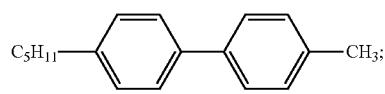

a compound accounting for 3% of the total weight of said liquid crystal composition:

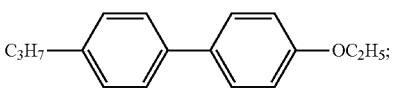

a compound accounting for 3% of the total weight of said liquid crystal composition:

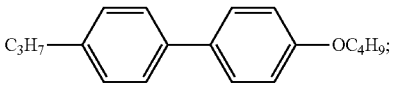

a compound accounting for 3% of the total weight of said liquid crystal composition:

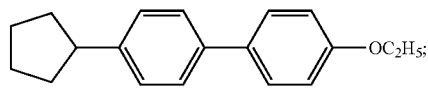

a compound accounting for 3% of the total weight of said liquid crystal composition:

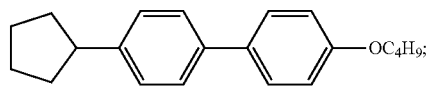

a compound accounting for 3% of the total weight of said liquid crystal composition:

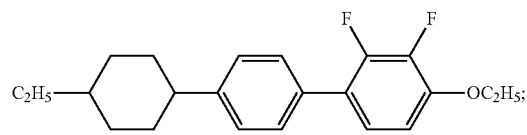

a compound accounting for 3% of the total weight of said liquid crystal composition:

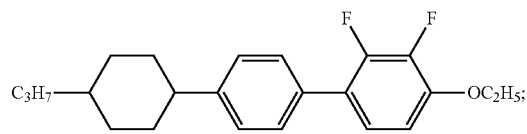

a compound accounting for 6% of the total weight of said liquid crystal composition:

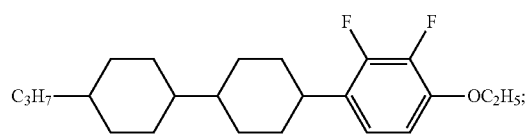

a compound accounting for 5% of the total weight of said liquid crystal composition:

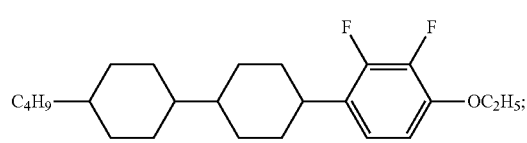

a compound accounting for 4% of the total weight of said liquid crystal composition:

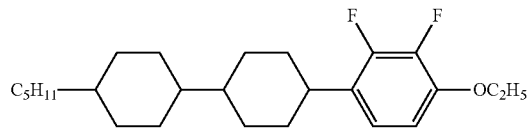

a compound accounting for 4% of the total weight of said liquid crystal composition:

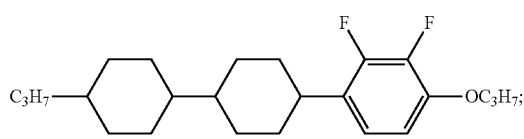

a compound accounting for 7% of the total weight of said liquid crystal composition:

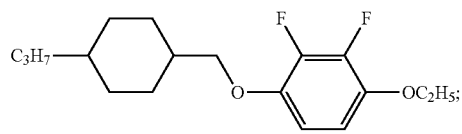

a compound accounting for 5% of the total weight of said liquid crystal composition:

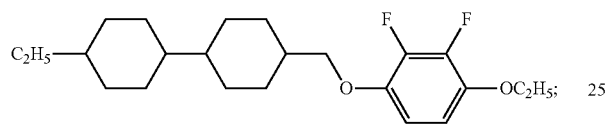

a compound accounting for 7% of the total weight of said liquid crystal composition:

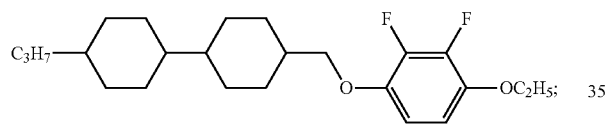

a compound accounting for 4% of the total weight of said liquid crystal composition:

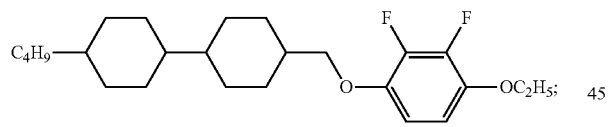

a compound accounting for 4% of the total weight of said liquid crystal composition:

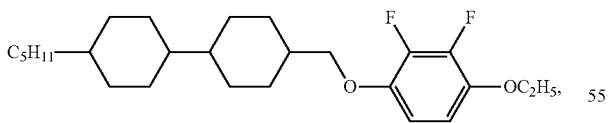

or said liquid crystal composition comprises:
a compound accounting for 23% of the total weight of said liquid crystal composition:

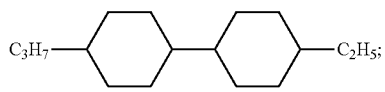

a compound accounting for 7% of the total weight of said liquid crystal composition:

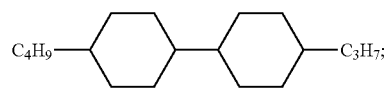

a compound accounting for 4% of the total weight of said liquid crystal composition:

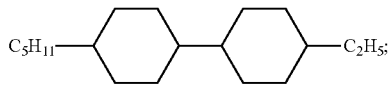

a compound accounting for 4% of the total weight of said liquid crystal composition:

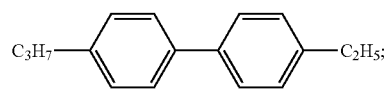

a compound accounting for 3% of the total weight of said liquid crystal composition:

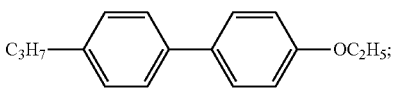

a compound accounting for 7% of the total weight of said liquid crystal composition:

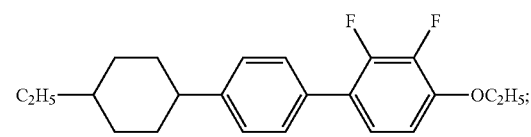

a compound accounting for 10% of the total weight of said liquid crystal composition:

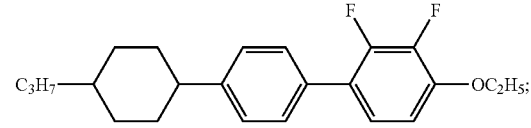

a compound accounting for 11% of the total weight of said liquid crystal composition:

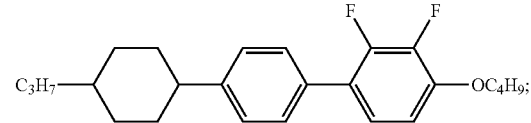

a compound accounting for 5% of the total weight of said liquid crystal composition:

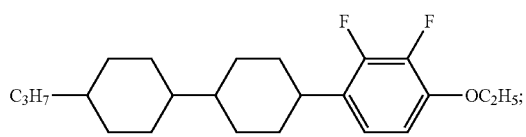

a compound accounting for 5% of the total weight of said liquid crystal composition:

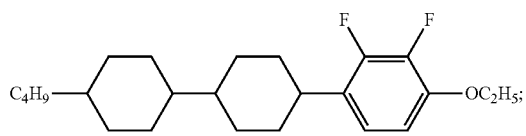

a compound accounting for 5% of the total weight of said liquid crystal composition:

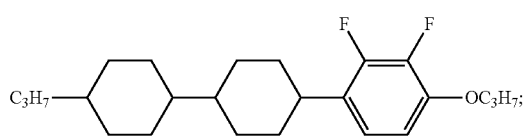

a compound accounting for 11% of the total weight of said liquid crystal composition:

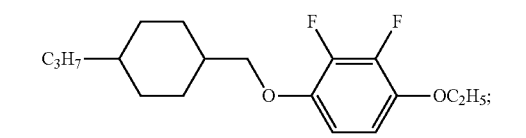

a compound accounting for 2% of the total weight of said liquid crystal composition:

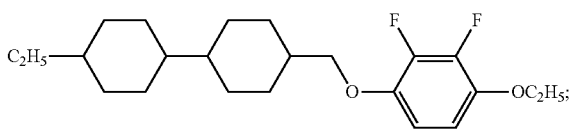 [SMILES: CCOc1ccc(OCC2CCC(C3CCC(CC)CC3)CC2)c(F)c1F]

and a compound accounting for 3% of the total weight of said liquid crystal composition:

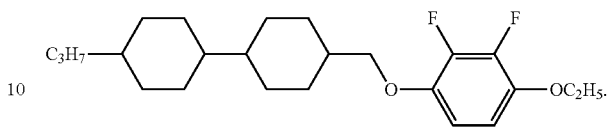

11. A mixture comprising the liquid crystal composition having a negative dielectric anisotropy of claim 1 and one or more polymerizable liquid crystal compounds complying with the following formula RM:

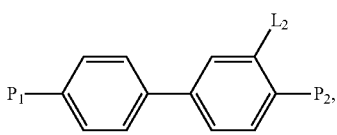

wherein $P_1$ and $P_2$ are the same or different, and each independently represents

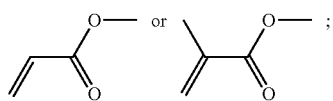

$L_2$ represents H or F.

12. A liquid crystal display, comprising the liquid crystal composition having a negative dielectric anisotropy of claim 1.

13. A liquid crystal display, comprising the mixture of claim 11.

\* \* \* \* \*